Aug. 6, 1968 W. L. PETROSKY 3,395,440
METHOD OF SKIVING A GASKET JACKET
Filed July 2, 1963
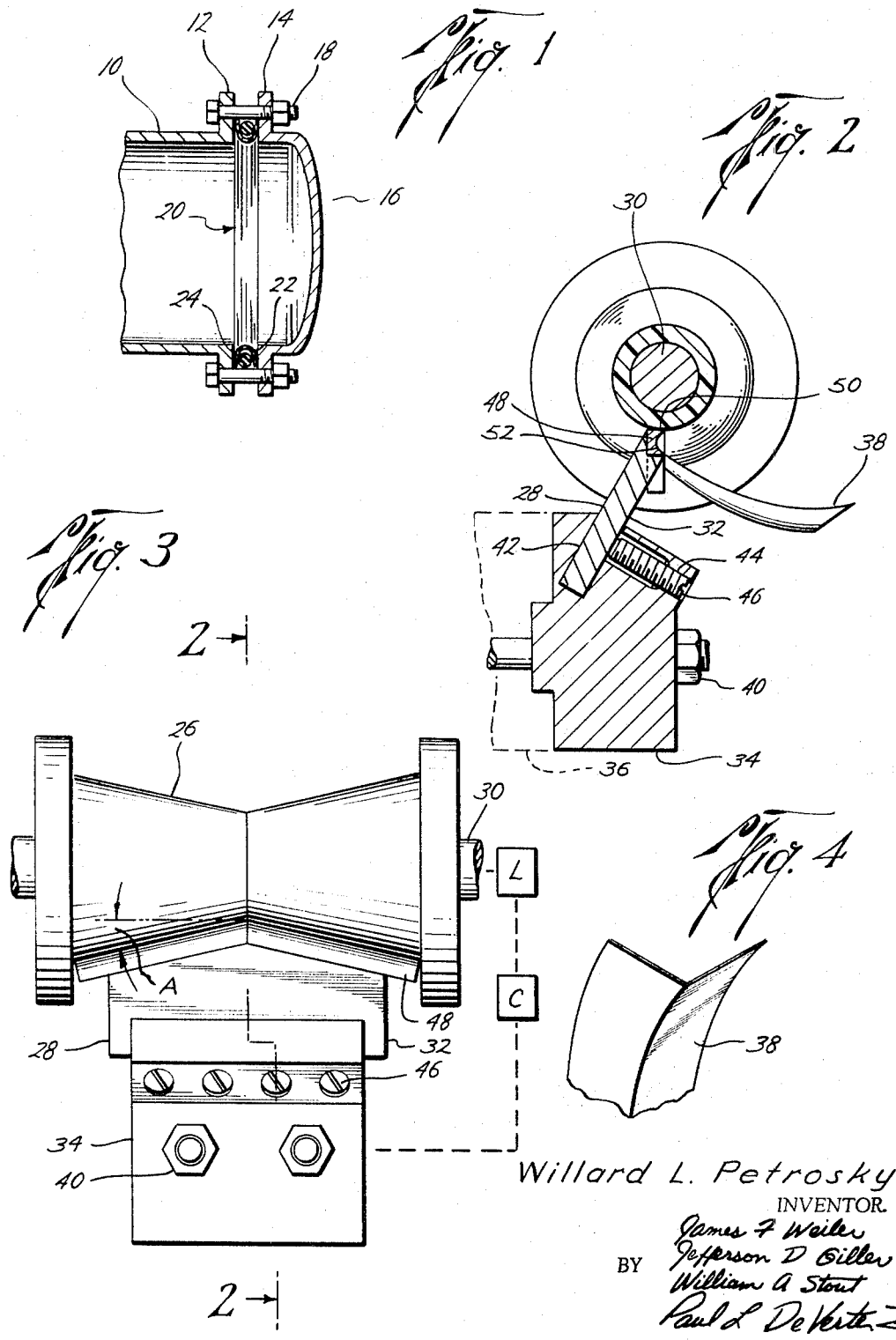
Willard L. Petrosky
INVENTOR.
BY James F. Weiler
Jefferson D. Giller
William A. Stout
Paul L. DeVerter II
ATTORNEYS

United States Patent Office 3,395,440
Patented Aug. 6, 1968

3,395,440
METHOD OF SKIVING A GASKET JACKET
Willard L. Petrosky, Houston, Tex., assignor to John L. Doré Co., Houston, Tex., a corporation of Texas
Filed July 2, 1963, Ser. No. 292,292
3 Claims. (Cl. 29—428)

The present invention relates to a large diameter jacket for gaskets, and the gasket so produced, and more specifically to a large diameter gasket and jacket for use under adverse environmental conditions, particularly where a fluorocarbon material is required. Further, the present invention relates to the method of producing such a gasket and the tool therefor.

As is well known, a gasket is a sealing device which is used to prevent leakage of fluid from between mating stationary components in a flange-joint system. Such leakage is typically caused by irregularities or space between the abutting flanges. In order for a gasket to perform satisfactorily, it must provide two basic requirements. First, the gasket must be environmentally inert both to the medium being handled and to the flanges which it contacts. Second, the gasket must be capable of sufficient deformation to seal any irregularities in the abutting flanges, and at the same time must be hard enough to remain in place and soft enough not to excessively deform the flanges due to its presence.

To meet these requirements a jacket, "French," or envelope gasket has been developed. Such a gasket typically comprises an appropriate jacket or envelope, into which is placed an appropriate filler or compression material. The envelope is so constructed that the fluid being handled in the conduit cannot reach the filler and thus be contaminated. Such jackets have in the past been constructed of fluorocarbon material, such as Teflon, in order that they might take advantage of this type material's inert properties. Previously, such fluorocarbon jackets have been made by parting a section from the end of a molded cylinder of fluorocarbon material, milling a narrow U-shaped groove radially inwardly into a disc, or by forming fluorocarbon tape into a circle and fusing the ends together. The latter method is the most widely used and is of particular interest to this invention.

The conventional method employed in fabricating the tape type jacket from a section of flat fluorocarbon tape is by stretching or elongating the tape into a given diameter. Unfortunately, this method sets up stresses in the tape while it is being stretched or elongated into shape. Further, pinholes often occur in such sections that are overstressed.

The present invention is directed to a method, product, and tool for providing the fluorocarbon jacket for large diameter gaskets which eliminate the detrimental effects of overstressing and pinholes so as to provide a jacket for gaskets which is inert, slightly deformable, and may be used with any appropriate filler.

As can well be imagined, any process of milling the narrow groove in a disc of the fluorocarbon material, or parting a section from the end of a molded cylinder will be quite expensive and thus commercially unacceptable.

Thus it is an object of the present invention to provide a gasket jacket, method, and tool which is not burdened by the disadvantages of the prior structures, and which is simple, and efficient in use.

Yet another object of the present invention is to provide a gasket jacket which readily conforms to a large diameter so that it may be placed upon a flange without distortion or stress.

Yet another object of the present invention is to provide a method for producing a gasket jacket which includes forming a V-shaped cutting tool, rotating a cylinder of jacket material, skiving a uniform V-shaped layer of jacket material from the cylinder with the tool, and joining the skived layer into a circle whereupon the filler may be inserted and the product used as a gasket.

Still another object of the present invention is to provide a skiving tool having a generally V-shaped cutting edge, the angle of which V changes in relation to the ultimate diameter of the gasket jacket being produced, and which tool will produce an indefinite length of gasket jacket material which will conform to the flange without developing pinholes or stresses.

Other and further objects, features, and advantages will be apparent from the following description of a presently preferred embodiment of the invention, given for the purpose of disclosure, taken in conjunction with the accompanying drawings, where like character references designate like parts throughout the several views, and where:

FIGURE 1 is a partial sectional view of a conduit with an appropriate bulkhead bolted thereto, showing the envelope gasket of the present invention therebetween, FIGURE 2 is a sectional side view showing the tool of the present invention while practicing the method, and taken along the line 2—2 of FIGURE 3, FIGURE 3 is a partial top view of the tool of the present invention when practicing the method, and FIGURE 4 is a partial perspective view of the gasket jacket of the present invention.

Generally, the present invention comprises a particular shaped large diameter gasket jacket, a method for producing such a product, and a tool which is particularly suited for use in practicing the method.

Referring now to the drawings, and particularly to FIGURE 1, the reference numeral 10 generally designates a large diameter fluid conduit, such as a pipe, heat exchanger, process tank, or the like. The term "large diameter" refers to the conduit, flange, or gasket diameter and includes gaskets of 20 inch or larger diameter. The conduit 10 terminates in a flange 12. Adjacent the flange 12 is a corresponding flange 14 of another conduit 16, here shown as a large bulkhead as for use with a heat exchanger. The conduits 10 and 16 are secured together by means of a conventional fastening means 18, here shown as a nut and bolt.

Disposed between the flanges 12 and 14 is an envelope gasket 20, which generally includes a jacket or envelope 22 of generally U-shaped cross section, and disposed between the legs of the U is an appropriate filler 24. Although the filler 24 is here shown as an O-ring, it is understood that any conventional filler could be utilized, such as a rectangular cross-section asbestos filler, rubber, neoprene, or the like, the particular filler details being determined by the pressure and compression conditions under which the gasket 20 is intended to operate.

The jacket 22 which surrounds the filler 24 is hereafter described as a fluorocarbon material, which is intended to include such products as Teflon (Du Pont's polytetrafluoroethylene), Kel-F (Kellogg's trifluorochloroethylene), Fluorogreen (Doré's filled polytetrafluoroethylene), or any similar material which is somewhat flexible in thin cross-sections, inert under the environmental conditions contemplated, machineable, and impervious.

It is apparent in considering the cross-section of the jacket 22 of FIGURE 1 that such a jacket might be made by milling out a narrow U-shaped groove from the disc of fluorocarbon material. However, in order to make such a jacket with an internal diameter of 20 inches or greater, it is necessary to start with a disc over 20 inches in diameter. The cost of manufacturing such a disc is prohibitive, consequently this method is never used for such large diameter jackets. Another method of producing such a jacket would be to slit the end of a cylinder of fluorocarbon material on a lathe, and then cut off the slit portion, thus producing a generally Y-shaped piece. Again, this method would require the use of a cylinder of fluorocarbon material whose diameter is that of the finished gasket. Again, because of the cost consideration, such a method of manufacture is uneconomical. Further, as regards both of the preceding methods, there is considerable doubt as to whether such a large cylinder of fluorocarbon material is capable of being produced in view of the present state of the art.

Therefore, the present practice in making jackets for gaskets in diameters of 20 inches or more is to form a tape of the fluorocarbon material, bend or fold this tape into a V- or U-shaped section, and stretch the resulting section into a large diameter. It is apparent from this method that the fluorocarbon tape is highly stressed in the fold region, and is further highly stressed at the outer diameter, or legs of the U. Often this overstressing of the fluorocarbon material results in pinholes and other failures, thus rendering the jacket useless.

The present invention is designed to overcome the stress problems created by the prior construction methods, and to produce a jacket of fluorocarbon material for an envelope gasket which does not have the inherent stressed portion that is common with the prior art. Further, the present invention utilizes a relatively small cylinder of the fluorocarbon material from which to make the jacket, and the method of making the jacket automatically forms a U- or V-shaped section when fabricated, as will be hereinafter described.

Briefly, the method of the present invention includes forming a V-shaped cutting tool, rotating a cylinder of fluorocarbon material, skiving the cylinder with the V-shaped tool, so as to produce a long V-shaped length of fluorocarbon material, and joining the two ends of the length of skived fluorocarbon material to form a large diameter circle. Thereupon, the filler 24 is placed within the legs of the V and the gasket is complete.

Referring now to FIGURES 2 and 3, the reference numeral 26 designates a large cylinder of fluorocarbon material which is supported along its rotational axis by the mandrel 30. In turn, the mandrel 30 is supported in a conventional manner by an appropriate lathe, or other turning machine, which, being conventional, is designated by the symbol L.

Mounted perpendicular to the axis of the cylinder of fluorocarbon material 26 is a cutting tool or skiving knife 32. The skiving knife 32 is in turn supported by a tool holder 34, which is in turn supported by an appropriate rest 36 which may be a typical lathe compound rest. In a conventional manner, the rest 36 is mechanically interconnected to the lathe L by means of the cross-feed C, so that rotation of the cylinder 26 is accompanied by radially inward movement of the rest 36. Thus, it is now apparent that rotation of the lathe L will in turn rotate the cylinder 26, and at the same time through the cross-feed C will result in movement of the rest 36 and thus the skiving knife 32 radially inwardly toward and perpendicular to the cylinder 26. As a result of these combined movements, a tape 38 of fluorocarbon material is cut or skivied from the cylinder 26.

It is, of course, apparent that in a conventional manner the cross-feed C may be adjusted for any desired thickness of the skived tape 38. Generally, the thickness is 1/64 of an inch or less.

The tool holder 34 generally comprises a large block which is bolted to the compound rest 36 by the fastening means 40, here shown as a nut and bolt. On the side of the tool holder 34 which is adjacent the axis of the mandrel 30 is an inclined slot 42. Perpendicular to the slot 42 and extending through the top of the tool holder 34 are tapped holes 44 into which are place set screws 46 which may be appropriately tightened against the tool 32 when it is placed in the slot 42. The tool 32 is a generally flat body 28 of metal, such as tool steel, and attached to the edge of the body 28 facing the mandrel 30 is the cutter 48. The cutter 48 includes a sharp edge 50, immediately behind which is a groove 52. The function of the groove 52 is to turn the V-tape 38 which is cut from the cylinder 26 upwardly as shown in FIGURE 2 so as to avoid breaking or snagging the V-tape 38 on the tool holder 34.

In the designing of various diameter gasket jackets 20, it has been found extremely important that the angle of the cutter 48 bear a definite relationship to the final diameter of the gasket jacket 22. This angle A, shown in FIGURE 3, is the angle between the legs of the V-shaped cutter 48 and the axis of the cylinder 26 and varies with the final diameter of the gasket 20. The particular relationship between the angle A and the final inside diameter of the gasket is determined by the formula $$A + b = cD^n$$

wherein A is the angle in degrees, D is the finished inside diameter in inches, and $b$, $c$, and $n$ are constants whose values have been empirically determined to be substantially $b \approx 101.8$, $c \approx 149.2$ and $n \approx 0.579$. Various examples utilizing this relationship are shown in Table 1, and it is to be noted that the angle decreases as the inside diameter of the gasket increases. The angle A is, of course, equal on each side of the cutter 48. For general use, values other than those shown may be interpolated from this table, rather than from the foregoing formula.

*Table 1*

| Inside diameter of gasket in inches: | Angle A in degrees |
|---|---|
| 60 | 7½ |
| 46 | 12½ |
| 36 | 17½ |
| 28 | 22½ |

The total width of the cutter 48 along the axis of the cylinder 26 is substantially equivalent to the difference in the desired outside diameter and inside diameter of the finished gasket 20, and will, of course, be dictated by the size of the flange 12 to which the gasket 20 is to be applied.

As the tape 38 is skived from the rotating cylinder 26 by the radially inwardly uniformly moving cutter 48, due to the particular angle A of the cutter 48 hereinabove described, the tape 38 has the configuration shown in FIGURE 4. After a sufficient length of the tape 38 has been cut from the cylinder 26, then the tape 38 may be cut and placed or bent into an appropriate circle of the required diameter for the finished gasket jacket 22. Thereupon, the two ends of the length of the V-shaped tape 38 are appropriately joined together. One method of so joining the ends of the length of tape 38 is by cementing and yet another method is by fusion welding, both of which are conventional. In any event, it is required that the joints be impervious to the fluid environment in which the jacket 22 will be placed, and further that the joint still retain a sufficient degree of deformability, so that it will conform to the flanges 12 and 14 and thus seal the conduit joint. After the length of the tape 38 has been joined into circle, so that the jacket gasket 22 is formed, an appropriate filler 24 is placed between the legs of the V. Thus, the jacketed gasket 20 is complete.

It is to be particularly noted that the finished gasket jacket 22 may be simply and readily made to the inside diameter of the conduit 10, and that it meets all the requirements normally expected of gaskets. Further, as distinguished from prior art tape-type gasket jackets, the present jacket 22 automatically assumes the cross-section shown in FIGURE 1 by joining the ends of the length of tape 38 into the predetermined circle diameter. No overstressed portions are produced, and consequently pinholes do not develop and the jacket 22 remains impervious.

Furthermore, advantageously, the method of the present invention efficiently produces an impervious and unstressed gasket 22 by the steps of forming a V-shaped cutter, rotating a cylinder of fluorocarbon material, skiving a uniform shaped layer of the material from the rotating cylinder with the cutting tool, and finally joining the skived layer into a circle.

Finally, the tool of the present invention differs structurally from prior flat skiving knives and advantageously produces a gasket jacket free from the defects of the prior art.

The present invention, therefore, is well adapted to carry out the objects and attain the ends and advantages mentioned as well as others inherent therein. While a presently preferred embodiment of the invention has been given for the purpose of disclosure, numerous changes in the detailed construction, and the combination, shape, size, and arrangement of parts and steps and uses may be resorted to without departing from the spirit and scope of the invention as hereinafter claimed.

What is claimed is:

1. The method of producing a circular gasket jacket of V-shaped cross-section and predetermined diameter including,
   rotating a cylinder of jacket material,
   skiving a uniform V-shaped layer of jacket material of a length equal to the circumference of a circle of predetermined diameter from the cylinder with a V-shaped tool whose angle varies in relation to the predetermined diameter, and
   joining the ends of the skived layer a circle to form a circle of the predetermined diameter.

2. The method of producing a fluorocarbon gasket jacket of large diameter including,
   rotating a cylinder of fluorocarbon about its axis,
   aligning a V-shaped cutter perpendicular to the cylinder axis with the point of the V adjacent the cylinder, the angle defined by the leg of the V and the axis of the cylinder varying in inverse relation to the gasket diameter,
   feeding the cutter uniformly into the rotating cylinder, and
   cutting a V-shaped length of material from the cylinder.

3. The invention of claim 2 including,
   joining the ends of the cut length into a continuous loop.

References Cited

UNITED STATES PATENTS

| | | | |
|---|---|---|---|
| 1,727,732 | 9/1929 | Ryan | 82—47 |
| 3,230,803 | 1/1966 | Guilford | 82—46 |
| 3,084,576 | 4/1963 | Dulebon | 82—46 |
| 2,964,982 | 12/1960 | Jobert | 82—46 |
| 3,079,670 | 3/1963 | Price | 29—95 |
| 2,979,805 | 4/1962 | Johnson | 29—95 |
| 410,993 | 9/1889 | Samuel | 29—555 |
| 1,924,114 | 8/1933 | Evans | 29—555 |
| 1,359,170 | 11/1920 | Hatfield | 277—206 |
| 2,705,177 | 3/1955 | Waring | 277—205 X |

FOREIGN PATENTS

| | | |
|---|---|---|
| 770,048 | 3/1957 | Great Britain. |

JOHN F. CAMPBELL, *Primary Examiner.*

P. M. COHEN, *Assistant Examiner.*